Patented July 15, 1952

2,603,584

UNITED STATES PATENT OFFICE 2,603,584

AUREOMYCIN COMPLEX

Charles Pidacks, Montvale, N. J., and George Madison Sieger, Jr., Pearl River, N. Y., assignors to American Cyanamid Company, New York, N. Y., a corporation of Maine No Drawing. Application April 5, 1949, Serial No. 85,718

5 Claims. (Cl. 167—65)

Our invention relates to the invention of certain borate complexes of aureomycin, which compounds have valuable therapeutic properties and certain physical properties which render them particularly useful for therapeutic purposes; and to methods of preparing these derivatives.

The antibiotic aureomycin is described in detail, including a method of preparation and certain of its theraupetic advantages, in the Annals of the New York Academy of Sciences, vol. 51, article 2, pages 175–342, published by the Academy at New York on November 30, 1948. This publication describes the sodium salt, the hydrochloride, and the free base. Aureomycin is amphoteric in nature, having both acid and basic groups within its molecular structure. There is at least one replaceable acidic hydrogen and at least one group which behaves as a base and appears to possess certain characteristics of an amino group.

We have found that by treatment of the free aureomycin with boric acid or a borate there is formed a borate complex which is useful in many therapeutic preparations, possessing advantageous solubility and stability characteristics.

The material may be formed at the time of its use from dry materials such as dry aureomycin hydrochloride, dry sodium borate and dry sodium chloride, thereby forming an isotonic solution of the complex, or in the absence of sodium chloride, forming the aureomycin borate complex, or it may be prepared by treatment of either the free base, an alkali or alkali-earth metal salt, or an acid salt with a suitable boric acid solution such that by suitable adjustment of the pH with either an alkali or an acid, and stabilization by a buffer where desired, there is formed the desired aureomycin borate, which is conveniently water soluble, and which is particularly therapeutically effective because it may be prepared as a solution or an ointment at a pH of close to that of the normal body fluids. Sodium aureomycin or the aureomycin hydrochloride and the free base are not adequately soluble at pH's close to that of the normal body fluids, for many therapeutic purposes. While such compounds are useful it is more desirable that a more neutral compound than aureomycin hydrochloride or other acid or metallic salt be used for parenteral and many other purposes. For eyedrops, for aerosols, for inhalation, for tablets, for dusting powder, etc., it is desirable that nearly neutral solutions be used. Additionally, in the case of aureomycin, if the material is permitted to get more alkaline than a pH of about 7.5, its rate of decomposition is greatly increased so that it must be used rather promptly for best therapeutic results. By our invention, however, it is to be found that the borate compound now permits the use of aureomycin as a substantially neutral product and as such, permitting even greater utility for this remarkable substance. In one particular solution containing such an amount of boric acid that the pH on solution was 7.4, a therapeutic dose containing 10 milligrams of aureomycin per milliliter was obtained.

Aureomycin borate itself is soluble to the extent of about 250 milligrams per milliliter of water, giving a solution of about pH 8. For stability this is best reduced to a pH of not more than 7.5 with boric acid or a buffer. Therapeutically, it is generally desirable to use concentrations of less than 100 milligrams per milliliter, and normal saline rather than water as the diluent.

Our improved product, aureomycin borate, may either be preformed or it may be formed in place just prior to its use. In preforming the material it is possible to use any aureomycin salt including the alkali, alkaline earth, or acid salts or the free aureomycin itself. It is dissolved in a suitable solvent treated with boric acid, or a salt of a borate to form aureomycin borate, neutralized if necessary, and any foreign salts or materials removed if desired or necessary. It is particularly convenient to use the hydrochloride of aureomycin and sodium borate, because by this procedure sodium chloride is formed. Any of the sodium borates may be used, but the U. S. P. XIII is particularly convenient and is readily soluble. For many purposes, the presence of the sodium chloride is highly desirable; as for parenteral or topical application it is frequently desired that the solutions have sufficient salt present to be isotonic. Some physicians consider borates undesirable in compositions which are injected; others find their use perfectly satisfactory under normal conditions. Because of the very small quantities of solution which may be used, it is not necessary that the salinity of the solution be adjusted to that of the body fluids, but it is usually less painful to the patient.

Alternatively the aureomycin borate may be formed at the time of its use. This may be conveniently accomplished by preparing a vial in which aureomycin hydrochloride, sodium borate and, if desired, sodium chloride are filled dry. In the dry state this mixture is stable for prolonged periods and is highly satisfactory for shipping and handling. At the time of use by the addition of pure water the aureomycin is solubilized as its borate and if properly proportioned a substantially isotonic solution results. It is desirable that for such a preparation the quantities be adjusted so that a substantially neutral solution results, using a buffer, such as a sodium citrate system, if necessary. For stability of aureomycin it is necessary that the material will be not appreciably on the alkaline side. The material containing the borate is more stable than straight aureomycin at a similar pH but even so if the pH is appreciably above about 7.5 the aureomycin decomposes more rapidly than is desirable. The rate of decomposition is of course decreased by keeping the solution cold. For example, at a concentration of 5 milligrams per milliliter, and at 3° C., under similar conditions a solution of aureomycin borate at a pH of 8.5 lost 17.5% of its activity, while at a pH of 8.3 under similar conditions an aureomycin hydrochloride solution buffered with sodium glycine lost 88.2% of its activity, and a solution containing tribasic sodium phosphate, at a pH of 7.4 lost 64.6% of its activity.

From the therapeutic standpoint it is immaterial whether the aureomycin borate be formed and then dried or whether suitable aureomycin and borate salts are present so that on the addition of water the aureomycin borate is formed. From the standpoint of manufacturing operations the latter procedure is generally more convenient. Salts other than the sodium salt of the borate may be used and aureomycin salts other than the hydrochloride may be used but it is necessary that non-toxic salts be used or that such materials be removed from the aureomycin borate before its use.

As examples of our invention, for purposes of description but not limitation, the following are submitted.

Example 1

A solution of 80 milliliters of 4% boric acid was prepared, into which was introduced one gram of aureomycin hydrochloride. The solution was gently warmed (about 50° C.) for 10 minutes; a substantially complete solution ensued. The solution was adjusted to a pH of 7.0 with 1 N sodium hydroxide and diluted to 100 milliliters with 4% boric acid solution. The final pH was then 6.7. The solution was warmed for a few minutes at 60° C. and allowed to stand at room temperature for one hour. The solution remained free from precipitation and with only a slight haze, due to impurities. After filtering through sintered glass, the clear filtrate was filled into vials. The material may be used in the vials as such or it may be dried, as for example, by freezing and sublimation of the moisture which yields a light yellow powder which may be reconstituted. Therapeutically, dilution to 10 milligrams of aureomycin hydrochloride per milliliter results in a very useful product.

Example 2

The molecular weight of aureomycin is approximately 500. To 5 grams of the free base was added $\frac{1}{100}$ of a mole of sodium hydroxide, $\frac{1}{100}$ of a mole of sodium borate, and the whole suspended in 200 milliliters of water. A practically clear solution resulted. It is to be noted that while this work was done at room temperature, the temperature has practically no effect, and any temperature may be used but room temperature is most convenient. The solution was filtered and to the clear filtrate was added acetone until the aureomycin borate complex was substantially completely precipitated. Approximately 5 volumes of acetone per volume of aqueous solution was required. The precipitate was separated, reconstituted in water, the pH adjusted to 7.4, and the complex again precipitated with acetone. The precipitate was separated, yielding a light yellow powder, which is readily soluble to form a solution containing 10 milligrams per milliliter. On heating, the material starts to decompose at about 140° C. becoming completely black at 200° C., without melting.

Example 3

5 grams of aureomycin, free base and $\frac{1}{100}$ mole of sodium borate were suspended in 200 milliliters of water, and a practically clear solution resulted. The solution was then filtered, precipitated with acetone, the precipitate reconstituted in water, the pH adjusted to 7.4, again precipitated with acetone and the final product dried. The resulting precipitate was a light yellow powder similar to that above.

Example 4

As a dry powder, 25 milligrams of sodium borate (U. S. P. XIII), 25 milligrams of aureomycin hydrochloride and 62.5 milligrams of sodium chloride were ground together, sterilely, and filled into a vial. The dry powder is stable for over a year under normal storage conditions. The contends of the vial were diluted with 5 cc. of distilled water forming a solution containing 5 milligrams of aureomycin per cc. in a saline solution. The contents of the vial formed a convenient therapeutic solution for local application. The solution is particularly convenient for eye drops or nose drops. More than 25 milligrams is normally used parenterally for general therapeutic utility.

Example 5

5 grams of aureomycin sulphate, amorphus, and .01 mole of boric acid were suspended in 200 milliliters of water, forming a practically clear solution, which was filtered, the pH adjusted to 7.4 and sufficient sodium chloride added to form a normal saline solution. Samples of the solution were tested therapeutically, as prepared, and found satisfactory. Additional samples of 5 cc. were each placed in vials, frozen, the water sublimed off, and sealed, all operations being carried out under sterile conditions. The contents of the vials were a light yellow powder which was found to be stable for at least a year under normal storage conditions and which could be rapidly and readily reconstituted by the addition of 5 cc. of pyrogen free water to form a therapeutically useful dose.

Example 6

5 grams of the sodium salt of aureomycin were suspended in 200 milliliters of water, and sufficient boric acid added to assist in the solution of the aureomycin and adjust the pH to 7.4. The solution was filtered, forming a satisfactory therapeutic solution. The material was frozen and the water sublimed therefrom, forming a fine light yellow powder. The powder may be reconstituted by the addition of water at the time of use. Part of the powder was mixed with an ointment base to the extent of 250 milligrams of aureomycin per gram of the ointment and found to form a very satisfactory ointment for local application, as for example, to the eye or surface ulcers or infections.

*Example 7*

5 grams of aureomycin hydrochloride and .01 mole of sodium borate were suspended in 200 milliliters of water forming a substantially clear solution. Thereto was added 5 grams of sodium citrate and the pH adjusted to 7.0 thereby being formed a solution which is satisfactory for local application. On drying there was found to be a light yellow powder which is satisfactory for use in ointments or which may be reconstituted by the addition of water or normal saline to form therapeutically useful solutions.

Other buffers than sodium citrate may well be used but sodium citrate is particularly convenient and is known to be harmless when injected. Other salts of aureomycin may be used such as the potassium salt or other acid salts. From the standpoint of convenience the aureomycin hydrochloride is normally used because it is more usually available. Similarly sodium borate U. S. P. is convenient although any of the other borates of sodium may be used. We desire usually to buffer the solution slightly that it shall remain at the desired pH and may be diluted or reconstituted with less danger of a shift in the pH. Most physicians prefer that the material either be diluted with sterile water or with normal saline solution for injection into a patient, but of course it will be found that other diluents may be used as is desired by a particular practitioner. Up to approximately 250 milligrams of aureomycin per cc. may be dissolved but the average practitioner prefers a somewhat more dilute solution.

Having thus described certain of the aspects thereof, as our invention we claim:

1. An aureomycin borate complex.
2. A dry powder for the preparation of therapeutic solutions comprising sodium borate and aureomycin hydrochloride in approximately equal proportions.
3. A dry powder for the preparation of therapeutic solutions comprising essentially the borate salt of aureomycin.
4. A dry powder suitable for forming an aqueous isotonic solution of aureomycin borate for treatment of the eye consisting essentially of sodium borate, aureomycin hydrochloride and sodium chloride in the relative proportions of 25 milligrams of sodium borate, 25 milligrams of aureomycin hydrochloride and 62.5 milligrams of sodium chloride.
5. A dry, storage stable, therapeutically effective powder suitable for forming an aqueous solution containing aureomycin borate comprising: a therapeutically effective water-soluble form of aureomycin and a non-toxic water-soluble borate selected from the group consisting of boric acid and alkali metal borates.

CHARLES PIDACKS.
GEORGE MADISON SIEGER, Jr.

REFERENCES CITED

The following references are of record in the file of this patent:

UNITED STATES PATENTS

| Number | Name | Date |
|---|---|---|
| 2,092,028 | Scott | Sept. 7, 1937 |

OTHER REFERENCES

Braley, in J. A. M. A., October 9, 1948, pages 426, 427.